US008930052B2

(12) United States Patent
Whitfield

(10) Patent No.: US 8,930,052 B2
(45) Date of Patent: Jan. 6, 2015

(54) METHOD AND APPARATUS FOR CONTROLLING THE DRIVE SYSTEM FOR MOBILE EQUIPMENT SUCH AS A MOBILE CONSTRUCTION AND/OR MINING MACHINE

(75) Inventor: James A. Whitfield, Newport News, VA (US)

(73) Assignee: Liebherr Mining Equipment Company, Newport News, VA (US)

( * ) Notice: Subject to any disclaimer, the term of this patent is extended or adjusted under 35 U.S.C. 154(b) by 208 days.

(21) Appl. No.: 13/302,221

(22) Filed: Nov. 22, 2011

(65) Prior Publication Data

US 2012/0130578 A1    May 24, 2012

(30) Foreign Application Priority Data

Nov. 23, 2010    (DE) .......................... 10 2010 052 270

(51) Int. Cl.
*B60L 15/20* (2006.01)
*B60L 11/02* (2006.01)

(52) U.S. Cl.
CPC ............. *B60L 15/2036* (2013.01); *B60L 11/02* (2013.01); *B60L 2200/36* (2013.01); *B60L 2220/46* (2013.01); *B60L 2240/421* (2013.01); *B60L 2240/423* (2013.01); *Y02T 10/646* (2013.01); *Y02T 10/7077* (2013.01); *Y02T 10/648* (2013.01)
USPC .......................................................... 701/22

(58) Field of Classification Search
USPC .......................................................... 701/22
See application file for complete search history.

(56) References Cited

U.S. PATENT DOCUMENTS

| | | | | |
|---|---|---|---|---|
| 4,520,299 A * | 5/1985 | Konrad | ......................... | 318/587 |
| 4,709,775 A * | 12/1987 | Watanabe et al. | ............. | 180/233 |
| 4,825,131 A * | 4/1989 | Nozaki et al. | .................... | 318/52 |
| 5,343,971 A * | 9/1994 | Heidelberg et al. | ...... | 180/65.245 |
| 5,345,155 A * | 9/1994 | Masaki et al. | ........... | 318/400.07 |
| 5,365,431 A * | 11/1994 | Minezawa et al. | ............. | 701/22 |
| 5,376,868 A | 12/1994 | Toyoda et al. | | |
| 5,453,930 A * | 9/1995 | Imaseki et al. | .................. | 701/22 |
| 5,481,460 A * | 1/1996 | Masaki et al. | .................. | 701/50 |
| 6,150,780 A * | 11/2000 | Young et al. | .................. | 318/270 |
| 7,583,036 B2 * | 9/2009 | Kikuchi et al. | .................... | 318/5 |
| 7,742,852 B1 * | 6/2010 | Tang | ............................... | 701/22 |
| 2008/0254935 A1 * | 10/2008 | Kasuga et al. | .................... | 477/3 |
| 2009/0255746 A1 * | 10/2009 | Boesch | ......................... | 180/197 |
| 2010/0222951 A1 * | 9/2010 | Tanaka et al. | .................. | 701/22 |

(Continued)

FOREIGN PATENT DOCUMENTS

DE    26 21 374 A1    11/1977
DE    40 11 291 A1    10/1991

(Continued)

*Primary Examiner* — John R Olszewski
*Assistant Examiner* — Navid Ziaeianmehdizadeh
(74) *Attorney, Agent, or Firm* — Dilworth & Barrese, LLP

(57) ABSTRACT

The present invention relates to a method and an apparatus for controlling the drive system for mobile equipment, when the operator's drive commander is kept constant, electric traction motors are controlled by a torque controller to provide uniform torque, deviations in speeds of the electric traction motors are determined and electric motor power of at least one is varied relatively to the electric motor power of the other in response to a determined deviation in speed to keep the torques uniform. The power control balancing compensates for the torque differences previously encountered when the speeds of the traction motors differ at equal power supplied to the traction motors.

19 Claims, 4 Drawing Sheets

(56) References Cited

U.S. PATENT DOCUMENTS

| | | | |
|---|---|---|---|
| 2012/0116619 A1* | 5/2012 | Tate et al. | 701/22 |
| 2013/0231832 A1* | 9/2013 | Yang | 701/59 |
| 2013/0253770 A1* | 9/2013 | Nishikawa et al. | 701/42 |
| 2013/0261863 A1* | 10/2013 | Noguchi | 701/22 |

FOREIGN PATENT DOCUMENTS

| | | |
|---|---|---|
| DE | 41 33 060 C2 | 4/1993 |
| DE | 195 40 067 C2 | 4/1997 |
| DE | 10 2007 017 821 A1 | 10/2008 |

\* cited by examiner

METHOD AND APPARATUS FOR CONTROLLING THE DRIVE SYSTEM FOR MOBILE EQUIPMENT SUCH AS A MOBILE CONSTRUCTION AND/OR MINING MACHINE

BACKGROUND OF THE INVENTION

The present invention relates to a method and an apparatus for controlling the drive system for mobile equipment such as a mobile construction and/or mining machine, in particular mining truck, said drive system comprising at least two electric traction motors for driving separate wheels or separate crawler chains of said mobile construction and/or mining machine and a control unit for controlling speed, power output and/or torque of said electric traction motors, said control unit comprising an operator's drive commander for choosing a desired machine speed and/or desired power output.

Mobile construction and/or mining machines such as mining trucks or crawler chain vehicles often have an electric drive system including separate electric traction motors for individually driving some or all of the wheels wherein, when equipped with a crawler chain, said wheels may include driving wheels for driving the crawler chains. Usually a left traction motor is associated with a left wheel whereas a right traction motor is associated with a right wheel of the machine, wherein each traction motor can be associated with a single wheel or a pair of wheels on the left side or the right side. For some applications it has also been suggested to provide for each individual wheel a separate electric traction motor.

Advantageously, a control unit includes independent switch gear such as an IGBT or a GTO to provide variable speed and torque control independently to each motor. Electric energy can be supplied to the electric traction motors from an internal combustion engine such as a diesel engine driving an electric generator and limiting the total power output of the electric traction motors.

To drive the construction or mining machine at a desired speed, the machine's operator enters a respective command through a drive commander such as a pedal or possibly joystick to choose a desired drive torque or a machine speed or a desired power output such as "full speed". In response to such command, which is commonly a torque command, the control unit controls or regulates the power output of the electric traction motors to drive the machine at the desired speed or at the possible speed at maximum capacity, for example, when taking a sloped road.

Beyond a certain speed, the drive capability of the electric traction motors is defined by a line of constant power up to a point where other drive related limitations such as the ratio of voltage to frequency V/Hz derate the curve below constant power. Traction motors operate at speeds that fall within the said constant power range speeds during the majority of operating time when the vehicle is moving.

FIG. 5 shows a typical speed/torque curve for an AC electric traction motor where it can be seen that in the aforementioned constant power range, the torque provided by the electric traction motor decreases with increasing speeds when the power supplied to the electric traction motor is kept constant. As can be seen from FIG. 5, the said constant power range is beyond the point of speed at which the motor provides its maximum torque output and defines a range of speeds where the torque decrease becomes smaller with increasing speed, that means the slope of the torque curve becomes less steep with increasing speed.

When 100% drive output is requested by the operator's drive command, typically, the instantaneous motor speed is captured and a torque command based of the curve is given independently of the other left or right drive. Normally, the left and right drives are speed synchronized via the ground so the speeds are the same and hence torques.

However, several factors can affect traction motor speed. The most relevant cases are (1) speed differential as a result of cornering and (2) individual motor speed fluctuations as a result of uneven ground, suspension and tyre dynamics.

In both cases, the resulting deviations of the traction motor speeds of the left and right drives cause torque differences when applying common drive control strategies.

For example, as shown in FIG. 6, when a speed difference is encountered during cornering, the left and right traction motors provide different torque when, according to a commonly applied control strategy, the control unit provides equal power to each traction motor, for example, when the drive is commanded to "full speed". When the operator's drive command is kept constant, for example to 100% or to 75%, the possible points of operation of the electric traction motors are described by the curve shown in FIG. 6. In other words, when the drive command is kept constant, the point of operation of the electric traction motors may move on said curve shown in FIG. 6 upon variation of external load or resistance. More particularly, when speed decreases, the point of operation is shifted to the left and consequently, the output torque is increased since, as mentioned before, the traction motors are operated in the constant power range where the torque/speed curve shows the characteristic decrease of FIGS. 5 and 6. On the other hand, when the speed increases, the output torque provided by the traction motor decreases when constant power is applied to the motor.

Therefore, as can be seen from FIG. 6, during cornering the left and right traction motors provide different torques due to the deviation in motor speeds when equal power is provided to each traction motor. More particularly, the inside wheel rotates at a reduced speed during cornering, whereas the outside wheel rotates at an increased speed during cornering. Consequently, the inside traction motor provides a higher torque than the outside traction motor, cf. FIG. 6.

Such torque difference is of course unfavourable for the vehicle. It can result in
- counter-steering torque, that means the torque difference opposes the turning direction,
- uneven frame loading leading to an increased frame fatigue.

Similarly, the aforementioned individual motor speed fluctuations resulting from uneven ground, suspension and tyre dynamics may cause deviations in motor speeds. Such traction motor speed changes due to truck dynamics are usually a phenomenon that affects an individual traction motor. During a dynamic event such as a bump in a road, a traction motor speed will experience sudden speed changes up to 50% depending on the severity of the event. In many cases, the events correspond to the resonant tyre or suspension frequency. Such changes in motor speed can cause torque fluctuations due to the characteristic torque speed behaviour shown in FIGS. 5 and 6 when equal power is supplied to the separate traction motors. Most often this can occur during traction or dynamic breaking events.

Such torque differences due to speed differences of the electric traction motors may cause stresses and oscillations in the frame and suspension elements, thereby reducing strength and in worst case creating microcracks in the structures.

SUMMARY OF THE INVENTION

Therefore, it is an objective of the present invention to provide an improved method and apparatus for controlling the drive system for a mobile construction and/or mining machine of the aforementioned type which avoid the disadvantages of the prior art and provide further developments thereof. More particularly, the drive system should be configured to minimize stresses and oscillations in the frame and suspension members of the machine due to differences in wheel speeds and to avoid fatigue in the chassis and suspension structures.

According to the present invention, this objective is achieved by a method and an apparatus according to the description herein. Preferred embodiments of the invention are also described herein.

More particularly, the present invention allows for differences in the power supply to the separate electric traction motors and does no longer maintain equal power to all electric traction motors despite the fact that the operator may choose a desired vehicle speed and/or command a desired drive power output such as "maximum output" or "75% output". To achieve a reduction of oscillating stresses in the frame and suspension elements, the control strategy provides for uniform torque between the electric traction motors. Taking into account the characteristic torque/speed curve of an electric traction motor operated in the constant power range, the traction motor power output is varied when the motor speed varies to compensate for unbalanced torque output. In accordance with the present invention, when the operator's drive commander is kept constant, the electric traction motors are controlled by a torque controller to provide uniform torque, wherein deviations in speeds of the electric traction motors are determined and electric motor power of at least one of said electric traction motors is varied relatively to the electric motor power of the other electric traction motor in response to a determined deviation in speed to keep the torques of the electric traction motors uniform. The power control balancing compensates for the torque differences previously encountered when the speeds of the traction motors differ at equal power supplied to the traction motors.

According to a preferred embodiment of the invention, the power control balancing may be adopted such that the total power output of all traction motors is kept constant. More particularly, upon detection of a deviation in speeds of the electric traction motors, the electric motor power of a traction motor running at a faster speed is increased whereas the motor power of the other traction motor running at a slower speed is decreased such that not only the torques are kept uniform, but the sum of the motor powers of the plurality of traction motors is kept constant. The increase in power output of one traction motor is balanced or compensated by the reduction in power output of the other traction motor(s). According to a preferred embodiment, as long as the motor capacity and/or power supply capacity allows, the torque of all traction motors can be kept at the level that would be provided by each motor when there would be no speed difference and equal power were supplied to each motor to meet the operator's command. To achieve such maintenance of the desired power output, the motor power of the motor running at increased speed is increased such that the torque decrease due to speed increase is compensated, whereas the motor power of the traction motor running at decreased speed is decreased to compensate for the torque increase. As the time of the deviations in speeds is usually brief, thermal concerns of overloading the motor the power of which is increased, do not apply. On the other hand, as the summation of the left and right traction motor powers is kept constant—although the left and right motor powers are allowed to differ from each other—, overload of the power supply, i.e. in particular the combustion engine driving the electric generator, is prevented.

On the other hand, if a drive system is not capable of intermittently going beyond the rated power, then a control is utilized to respect motor power limits at the expense of total power to the ground. More particularly, upon detection of a deviation in speeds of the electric traction motors, the electric motor power of the traction motor with the faster speed may be increased up to or may be kept at a rated maximum power to keep the torque of said traction motor as close as possible to the torque provided by the motor at the desired machine speed and/or desired power output according to the operator's command, whereas the electric power of the other electric traction motor is reduced such that the torques of the traction motors are kept uniform. Such control scheme provides for a reduction in total power output, however, torque differences between the traction motors are avoided and thus undesired stresses and oscillations of the frame and suspension members are prevented.

The electric motor power may be varied in different ways. According to a preferred embodiment, the current and/or voltage supplied to the respective electric traction motor may be varied to achieve the desired variation in motor power. However, other measures may be taken to vary the motor power to achieve the desired torque control.

Although the motor power may be varied over a rather wide range, according to a preferred embodiment the variation of electric motor power in response to deviations in speeds of the traction motors is limited such that each traction motor is kept within its speed range of constant power where the torque/speed curve shows the characteristic decrease with decreasing slope.

BRIEF DESCRIPTION OF THE DRAWINGS

These and other features and advantages of the present invention will become more apparent from the subsequent description of preferred embodiments of the invention and the corresponding drawings. In said drawings show.

DESCRIPTION OF THE PREFERRED EMBODIMENTS

Figure 1:
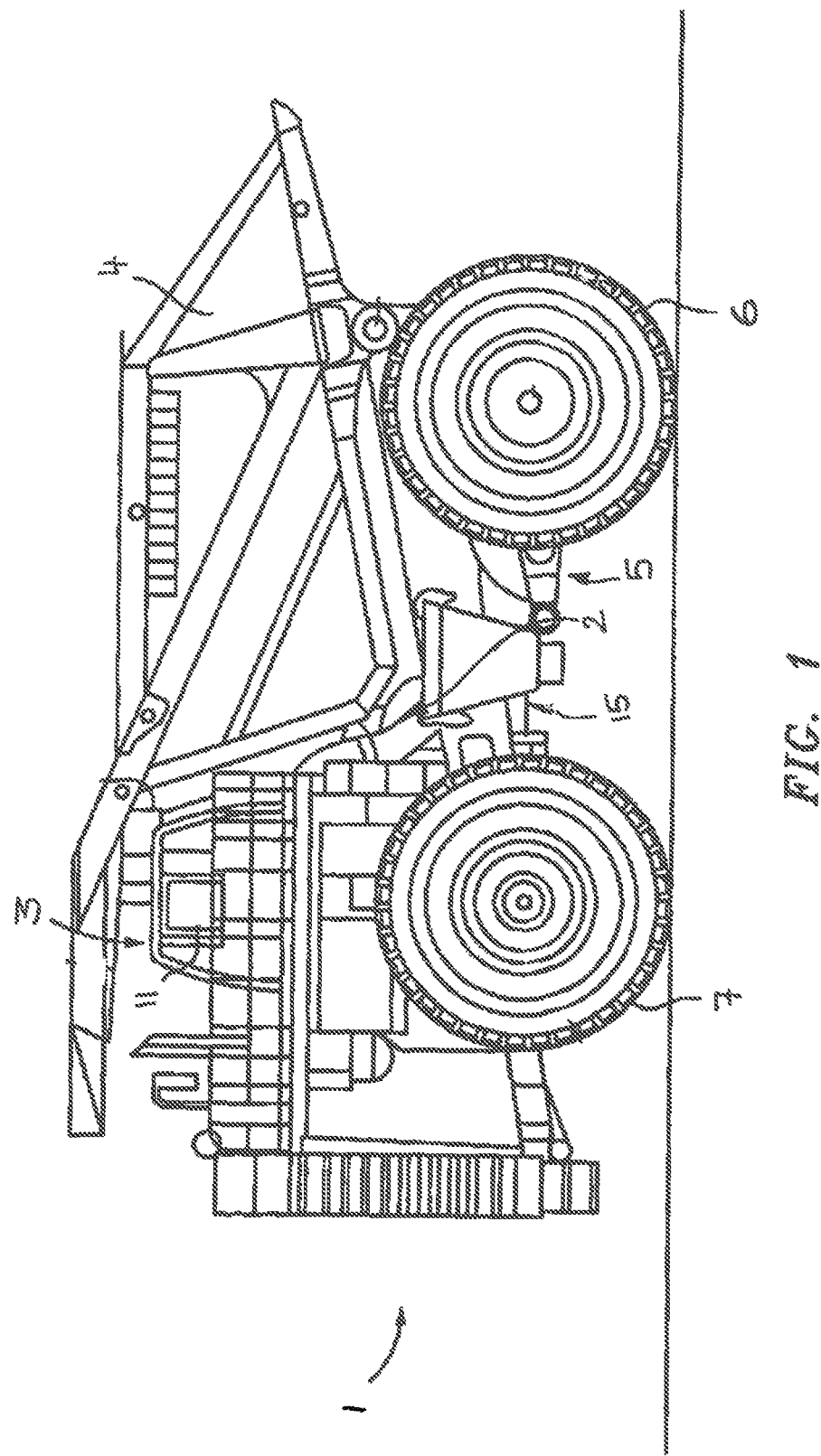
FIG. 1: a schematic side view of a large dump or mining truck provided with separate electric traction motors for individually driving the left and right wheels of the truck, said traction motors being controlled by a control unit schematically shown in FIG. 1 according to a preferred embodiment of the invention.

The large dump truck or mining truck 1 shown in the drawing includes a dump body or dump container 4 which is supported on a frame 2 which is supported on the ground via a chassis 15. An operator's cabin 3 is seated on the frame 2 in a manner known per se and extends above the front wheels 7 of the chassis 4. At least two rear wheels 6, e.g. two pairs of rear wheels 6L and 6R are provided at the rear axle of the chassis 15 which are advantageously driven separately by individual wheel drives. As can be seen from FIG. 2, a suspension 5 may include a left suspension assembly 5L for suspending a pair of left rear wheels 6L and a right suspension assembly 5R for suspending a pair of right rear wheels 6R. However, other embodiments of the suspension 5 are possible.

In the shown embodiment, the drive system 9 for driving the said rear wheels 6 includes separate traction motors 8R and 8L for driving the right and left rear wheels 6R and 6L individually, wherein it is possible to provide one traction motor for each pair of left and right rear wheels so that both wheels of one pair of wheels are driven by the same traction motor. On the other hand, it is also possible to provide one traction motor for each wheel to drive each wheel individually.

Figure 2:
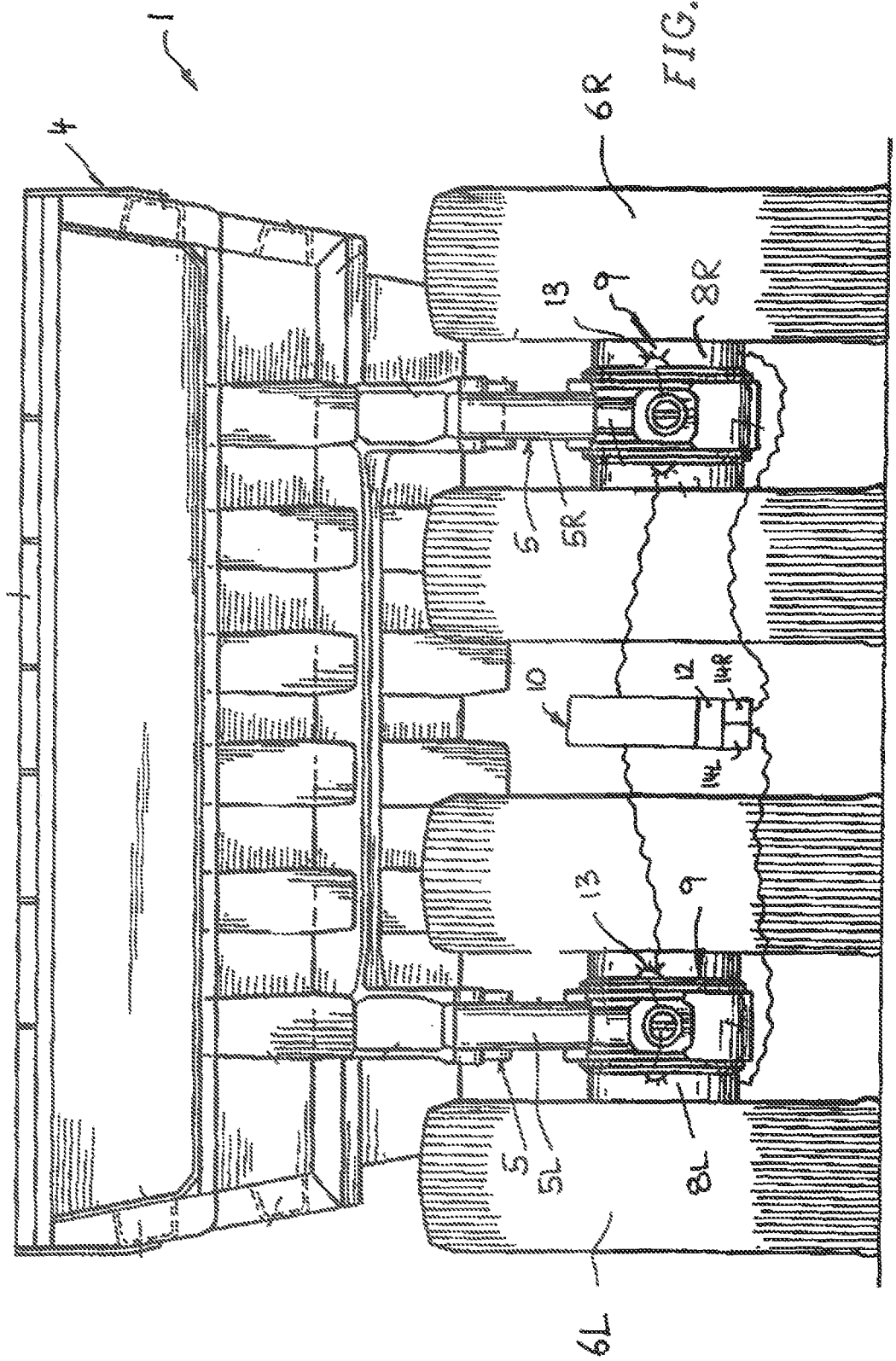
FIG. 2: a schematic view of the drive system with left and right traction motors associated with left and right wheels of the truck of FIG. 1, FIG. 3: a schematic representation of the torque control strategy of a preferred embodiment of the present invention shown in connection with a torque speed diagram of the electric traction motors of the truck of FIG. 1, where different motor powers are provided for the traction motors to achieve uniform torques and to keep the total power of all traction motors constant.

FIG. 2 also shows the control unit 10 for controlling speed, power output and/or torque of each traction motor 8R and 8L. To allow the operator to choose the desired speed of the dump truck 1 and/or the power output of the drive system 9, the said control unit 10 includes a drive commander 11 which may be a joystick and basically corresponds to the accelerator pedal of an automobile. Via said drive commander 11, commands may be issued to the drive system 9 to run at, e.g., 60% of its maximum capacity or at "full speed" corresponding to maximum capacity which is limited by the capacity of the combustion engine driving the electric generator supplying the current to the traction motors and/or the capacity of said traction motors 8R and 8L.

The said control unit 10 further includes a torque controller 12 individually regulating the power supply to the tractions motors 8R and 8L to maintain uniform torque when speed differences between the traction motors 8R and 8L occur. Such speed differences meaning differences in rotational speed of the traction motors 8R and 8L and/or the respective wheels 6L and 6R, can be detected by speed detection means 13 monitoring the speed of the traction motors 8R and 8L and/or speeds of the rear wheels 6L and 6R.

Figure 3:
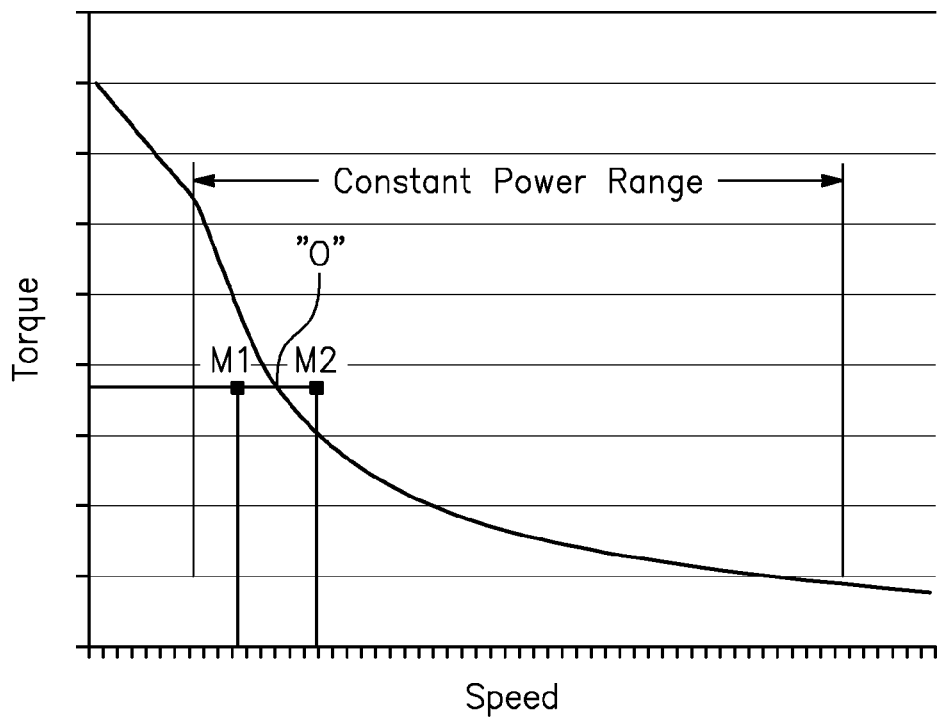

As can be seen from FIG. 3, when the operator commands a desired speed and/or desired power output to the drive system 9 by means of actuating the aforementioned drive commander 11, the traction motors 8R and 8L run within the constant power range shown in FIG. 3. More particularly, as long as there are no speed differences between the left and right traction motors, both traction motors 8R and 8L operate at a point "zero" on the torque/speed curve. As there are no speed differences, equal power is supplied to both traction motors 8R and 8L which provide the same torque at the same speed.

When the speed detection means 13 detect a deviation in motor speed between the left and right traction motors 8L and 8R, the torque controller 12 varies the power supplied to the traction motors 8L and 8R in response to the detected difference in motor speeds. As can be seen from FIG. 3, the torque controller 12 may be configured to reduce the power to the traction motor running at a lower speed and to increase the power to the traction motor running at the higher speed. As a deviation in speed is detected, the slower motor is controlled to have less torque than the constant power curve of FIG. 3 would allow. On the other hand, the faster motor is given a momentary torque boost outside the speed/torque curve of constant power. More particularly, each traction motor 8R and 8L is kept at the torque level of the aforementioned "normal" point of operation "zero". In FIG. 3, points M1 and M2 define the respective points of operation controlled by the torque controller 12 to provide power balancing and uniform torque and to compensate for deviations in speed.

According to another preferred embodiment of the invention, the left and right motor powers are allowed to differ, but the summation of the left and right motor powers are kept constant to prevent overload of the prime mover. The time of the deviations is usually brief so thermal concerns of overloading the motor should not apply.

Figure 4:
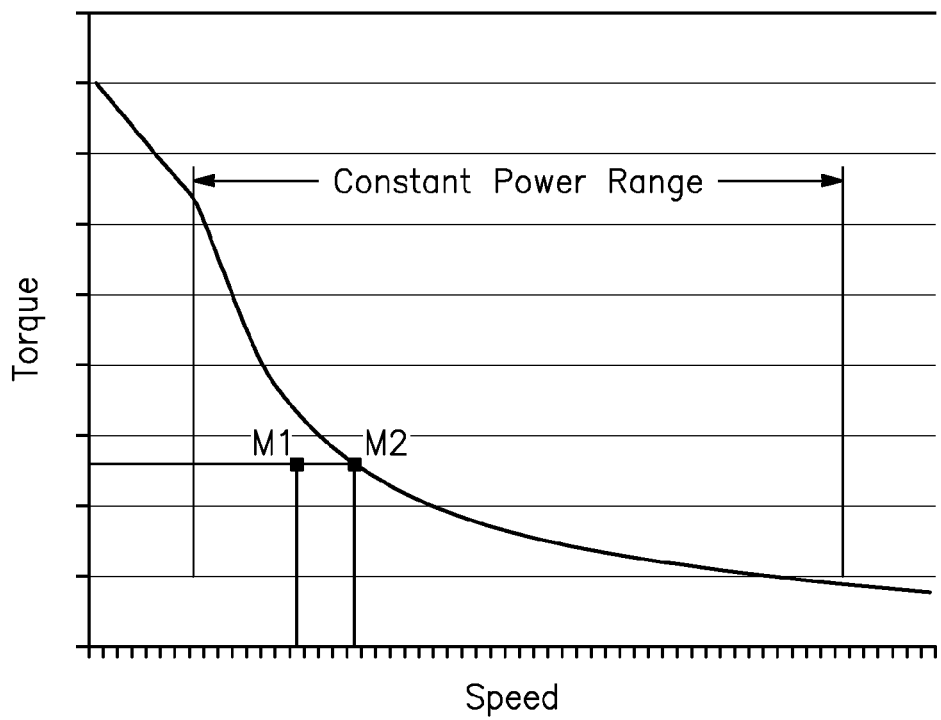
FIG. 4: a schematic representation of the torque control according to another embodiment of the present invention shown in connection with the characteristic torque/speed curve of the electric traction motors of the truck of FIG. 1, where the slower motor is torque limited to match the torque of the higher speed motor so the motor powers are allowed to be different and the resultant total motor power is reduced.
Figure 5:
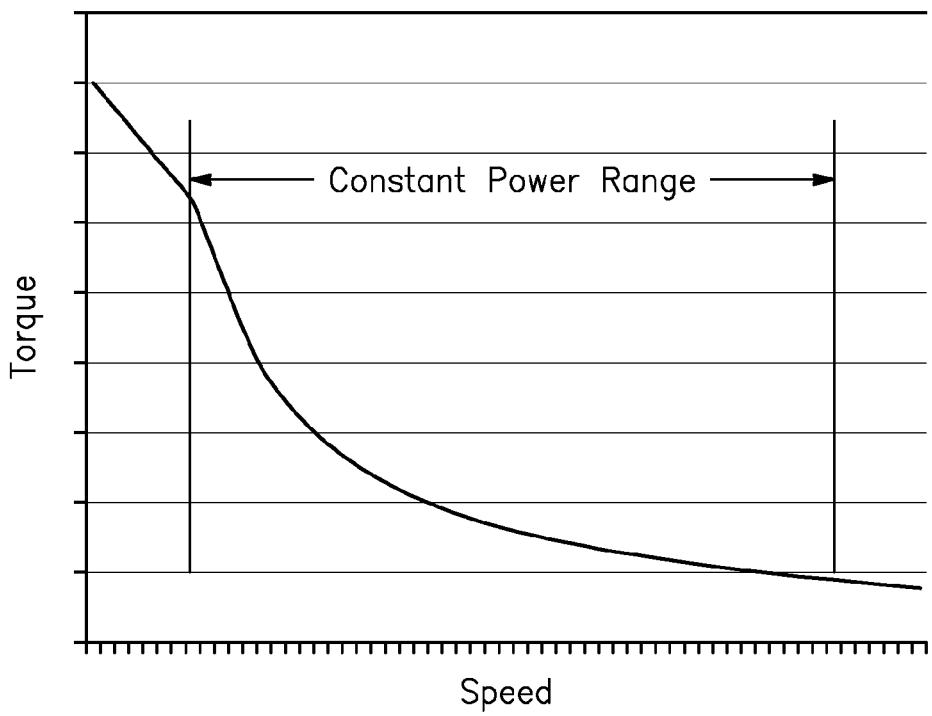
FIG. 5: a typical speed/torque curve of an alternating current traction motor illustrating the constant power range of such motor.
Figure 6:
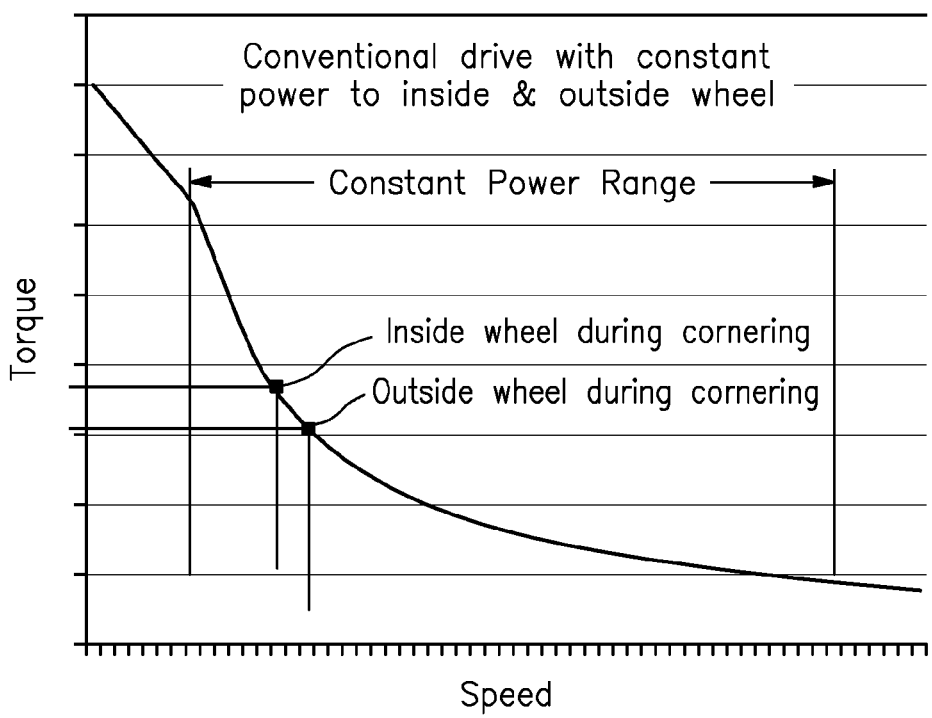
FIG. 6: a schematic representation of a prior art drive control strategy shown in connection with the characteristic torque/speed curve of a traction motor where equal power is supplied to the traction motors associated with the inside and outside wheels during cornering so the result is different torque applied to each motor.

Another control strategy provided by the torque controller 12 is shown in FIG. 4. If the drive system 10 is not capable of intermittently going beyond the rated power, then a control can be utilized to respect motor power limits at the expense of total power to the ground. As a deviation in motor speed and/or wheel speed is detected by the speed detection means 13, the slower traction motor is torque limited to match the torque of the higher speed motor. The left and right motor powers are also allowed to be different, whereas, however, in contrast to the embodiment of FIG. 3, the resultant total motor power is reduced. Also in FIG. 4, the points M1 and M2 define the points of operation of the right and left traction motors 8R and 8L as controlled by the torque controller 12 in response to a detected deviation in speed.

Although a large dump truck is shown in the drawings, the method and apparatus for controlling the drive system also may be applied to other trucks and various similar mobile equipment including wheel loaders and tracked machines such as dozers and crawler machines with crawler chains, wherein the said control method and apparatus are particularly valuable when used for large mobile construction and/or mining machines such as mining trucks.

The invention claimed is:

1. A method for controlling the drive system (9) for mobile equipment, said drive system (9) comprising
at least two electric traction motors (8R, 8L) for driving separate wheels (6L, 6R) or crawler chains of said mobile equipment, and
a control unit (10) for controlling at least one of speed, power output and torque of said electric traction motors (8R, 8L), said control unit (10) comprising
an operator's drive commander (11) for choosing at least one of a desired machine speed and desired power output, wherein
when the operator's drive commander is kept constant, the electric traction motors (8R, 8L) are controlled by a torque controller (12) to provide uniform torque between the electric traction motors (8R, 8L), and
deviations in speed of the electric traction motors (8R, 8L) are determined and electric motor power of at least one of said electric traction motors (8R, 8L) is varied relatively to the electric motor power of the other electric traction motor (8R, 8L) in response to a determined deviation in speeds to keep the torques of the electric traction motors (8R, 8L) uniform, and
wherein upon detection of a deviation in speeds of the electric traction motors (8R, 8L), the electric motor power of the electric traction motors (8R, 8L) running at the faster speed is increased whereas the electric motor power of the electric traction motor (8R, 8L) running at the slower speed is decreased such that the sum of the electric powers of the electric traction motors is kept constant and the torques are kept uniform.

2. Method according to claim 1, wherein the variation of the electric engine power in response to deviations in speeds of the electric traction motors (8R, 8L) is limited such that each electric traction motor (8R, 8L) is kept within its speed range of constant power.

3. Method according to claim 1, wherein the variation of the electric engine power in response to deviations in speeds of the electric traction motors (8R, 8L) is limited such that each electric traction motor (8R, 8L) is kept within its speed range of constant power.

4. Method according to claim 1, wherein upon detection of a deviation in speeds of the electric traction motors (8R, 8L), the electric motor power of the electric traction motor (8R, 8L) running at the faster speed is increased up to or kept at a rated maximum or desired power to keep the torque of said electric traction motor (8R, 8L) as close as possible to the torque provided by the electric traction motor (8R, 8L) at the at least one of the desired machine speed and the desired power output chosen by the operator's drive commander, whereas the electric power of the other electric traction motor (8R, 8L) is reduced such that the torques of the electric traction motors (8R, 8L) are kept uniform.

5. Method according to claim 4, wherein the variation of the electric engine power in response to deviations in speeds of the electric traction motors (8R, 8L) is limited such that each electric traction motor (8R, 8L) is kept within its speed range of constant power.

6. Method according to claim 4, wherein the electric motor power is varied by means of varying the at least one of the current and voltage supplied to the respective electric traction motor (8R, 8L).

7. Method according to claim 6, wherein the variation of the electric engine power in response to deviations in speeds of the electric traction motors (8R, 8L) is limited such that each electric traction motor (8R, 8L) is kept within its speed range of constant power.

8. Method according to claim 1, wherein the electric motor power is varied by means of varying at least one of the current and voltage supplied to the respective electric traction motor (8R, 8L).

9. Method according to claim 8, wherein the variation of the electric engine power in response to deviations in speeds of the electric traction motors (8R, 8L) is limited such that each electric traction motor (8R, 8L) is kept within its speed range of constant power.

10. Method according to claim 1, wherein upon detection of a deviation in speeds of the electric traction motors (8R, 8L), the electric motor power of the electric traction motor (8R, 8L) running at the faster speed is increased up to or kept at a rated maximum or desired power to keep the torque of said electric traction motor (8R, 8L) as close as possible to the torque provided by the electric traction motor (8R, 8L) at the at the least one of the desired machine speed and the desired power output chosen by the operator's drive commander, whereas the electric power of the other electric traction motor (8R, 8L) is reduced such that the torques of the electric traction motors (8R, 8L) are kept uniform.

11. Method according to claim 10, wherein the electric motor power is varied by means of varying the at least one of the current and voltage supplied to the respective electric traction motor (8R, 8L).

12. Method according to claim 11, wherein the variation of the electric engine power in response to deviations in speeds of the electric traction motors (8R, 8L) is limited such that each electric traction motor (8R, 8L) is kept within its speed range of constant power.

13. Method according to claim 10, wherein the variation of the electric engine power in response to deviations in speeds of the electric traction motors (8R, 8L) is limited such that each electric traction motor (8R, 8L) is kept within its speed range of constant power.

14. Method according to claim 1, wherein the electric motor power is varied by means of varying the at least one of the current and voltage supplied to the respective electric traction motor (8R, 8L).

15. Method according to claim 14, wherein the variation of the electric engine power in response to deviations in speeds of the electric traction motors (8R, 8L) is limited such that each electric traction motor (8R, 8L) is kept within its speed range of constant power.

16. An apparatus for controlling the drive systems for mobile equipment, said drive system (9) comprising
 at least two electric traction motors (8R, 8L) for driving separate wheels (6L, 6R) or crawler chains of said mobile equipment, and
 a control unit (10) for controlling speed, at least one of power output torque of said electric traction motors (8R, 8L), said control unit (10) comprising an operator's drive commander (11) for choosing a desired machine speed and/or desired power output, wherein
said control unit (10) includes a torque controller (12) for providing uniform torque between the electric traction motors (8R, 8L) when the operator's drive commander (11) is kept constant, furthermore speed detection means (13) for detecting wheel and/or motor speed of the electric traction motors (8R, 8L) and deviations thereof, said torque controller (12) including motor power controllers (14R, 14L) for varying the electric motor power of at least one of said electric traction motors (8R, 8L) relatively to the electric motor power of the other electric traction motor (8R, 8L) in response to the detected deviation in speed to keep the torques of the electric traction motors (8R, 8L) uniform, and
wherein upon detection of a deviation in speeds of the electric traction motors (8R, 8L), the electric motor power of the electric traction motors (8R, 8L) running at the faster speed is increased whereas the electric motor power of the electric traction motor (8R, 8L) running at the slower speed is decreased such that the sum of the electric powers of the electric traction motors is kept constant and the torques are kept uniform.

17. A mining truck comprising
 a dump body (4) for the transport of overburden, said dump body being supported on a dump truck chassis (15), left and right wheels (6L, 6R) for supporting the dump truck chassis (15) on the ground, and
 a drive system (9) for driving said left and right wheels (6L, 6R), said drive system (9) comprising
 at least two electric traction motors (8L, 8R) for driving said left and right wheels (6L, 6R), and further comprising an apparatus for controlling said drive system (9) as defined in claim 16.

18. A mobile machine of the group comprising wheel loader, dozer and truck, said mobile machine including
 a chassis (15), left and right drive elements selected from a group comprising wheels (6L, 6R) or crawler chains for supporting the dump truck chassis (15) on the ground, and a drive system (9) for driving said left and right drive elements (6L, 6R), said drive system (9) comprising at least two electric traction motors (8L, 8R) for driving said left and right drive elements (6L, 6R), and further comprising an apparatus for controlling said drive system (9) as defined in claim 16.

19. A method for controlling the drive system (9) for mobile equipment, said drive system (9) comprising at least two electric traction motors (8R, 8L) for driving separate wheels (6L, 6R) or crawler chains of said mobile equipment, and a control unit (10) for controlling at least one of speed, power output and torque of said electric traction motors (8R, 8L), said control unit (10) comprising an operator's drive commander (11) for choosing at least one of a desired machine speed and desired power output, wherein when the operator's drive commander is kept constant, the electric traction motors (8R, 8L) are controlled by a torque controller (12) to provide uniform torque between the electric traction motors (8R, 8L), and deviations in speed of the electric traction motors (8R, 8L) are determined and electric motor power of at least one of said electric traction motors (8R, 8L) is varied relatively to the electric motor power of the other electric traction motor (8R, 8L) in response to a determined deviation in speeds to keep the torques of the electric traction motors (8R, 8L) uniform, wherein upon detection of a deviation in speeds of the electric traction motors (8R, 8L), the electric motor power of the electric traction motors (8R, 8L) running at the faster speed is increased whereas the electric motor power of the electric traction motor (8R, 8L) running at the slower speed is decreased such that the sum of the electric powers of the electric traction motors is kept constant and the torques are kept uniform, and wherein the variation of the electric engine power in response to deviations in speeds of the electric traction motors (8R, 8L) is limited such that each electric traction motor (8R, 8L) is kept within its speed range of constant power.

* * * * *